(12) United States Patent
Kumar et al.

(10) Patent No.: US 7,500,436 B2
(45) Date of Patent: Mar. 10, 2009

(54) SYSTEM AND METHOD FOR MANAGING EMISSIONS FROM MOBILE VEHICLES

(75) Inventors: Ajith Kuttannair Kumar, Erie, PA (US); Steven Matthew Pelkowski, Erie, PA (US); Mark Bradshaw Kraeling, Melbourne, FL (US); Glen Paul Peltonen, Melbourne, FL (US); James Kiss, Melbourne, FL (US); Daniel Malachi Ballesty, Wattsburg, PA (US); Wolfgang Daum, Erie, PA (US); Bradley Charles Hendrickson, Erie, PA (US); Gerald James Hess, Jr., Lenexa, KS (US); Glenn Robert Shaffer, Erie, PA (US); Daniel F. Wolf, Erie, PA (US); Leonard Michael Hill, Erie, PA (US); Steven Andrew Kellner, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 11/136,769

(22) Filed: May 25, 2005

(65) Prior Publication Data
US 2006/0129289 A1 Jun. 15, 2006

Related U.S. Application Data

(63) Continuation-in-part of application No. 11/008,708, filed on Dec. 9, 2004, now Pat. No. 7,302,895, and a continuation-in-part of application No. 10/849,314, filed on May 19, 2004, now Pat. No. 7,131,614.

(60) Provisional application No. 60/474,151, filed on May 22, 2003, provisional application No. 60/590,853, filed on Jul. 23, 2004.

(51) Int. Cl.
*B61C 1/00* (2006.01)
*G05D 1/00* (2006.01)

(52) U.S. Cl. .................................. 105/26.05; 701/19
(58) Field of Classification Search .............. 105/26.05, 105/62.1, 62.2; 701/19, 20
See application file for complete search history.

(56) References Cited

U.S. PATENT DOCUMENTS 5,167,008 A 11/1992 Engeler (Continued)

FOREIGN PATENT DOCUMENTS

DE 4419851 A1 12/1995
DE 10037849 A1 2/2002

OTHER PUBLICATIONS

Digital Control of Dynamic Systems, By Gene F. Franklin, et al. Addision-Wesley Publishing Co., 1981, pp. 247-273.

*Primary Examiner*—S. Joseph Morano
*Assistant Examiner*—Robert J McCarry, Jr.
(74) *Attorney, Agent, or Firm*—Robert Wawrzyn, Esq.; Cian G. O'Brien, Esq.; Beusse Wolter Sanks Mora & Maire, P.A.

(57) ABSTRACT

A locomotive (10) is operable in two or more distinct configurations, with the change in configuration being response to a configuration input signal (35). A locomotive configuration is represented by the set of end use device control signals (13) that are generated by the locomotive control systems (22) in response to the respective set of operational input values (27). For a given set of operational input values, a first set of end use device control signals is generated when a configuration input has a first value, and a second set of end use device control signals is generated when a configuration input has a second value. The configuration input variable is responsive to an emission profile associated with the locomotive location. A value of a locomotive emission parameter corresponding to the emission profile is monitored and saved in a storage device (e.g., 104).

17 Claims, 6 Drawing Sheets

U.S. PATENT DOCUMENTS

| | | |
|---|---|---|
| 5,647,231 A | 7/1997 | Payne et al. |
| 5,857,321 A | 1/1999 | Rajamani et al. |
| 6,078,911 A | 6/2000 | Bonissone et al. |
| 6,144,901 A | 11/2000 | Nickles et al. |
| 6,622,067 B1 | 9/2003 | Lovelace, II et al. |
| 6,636,798 B2 * | 10/2003 | Biess et al. ............... 701/112 |
| 6,658,330 B2 | 12/2003 | Delaruelle |
| 6,760,712 B1 | 7/2004 | Bonissone et al. |
| 2002/0059075 A1 | 5/2002 | Schick et al. |
| 2003/0078707 A1 | 4/2003 | Shioda et al. |
| 2003/0213875 A1 | 11/2003 | Hess, Jr. et al. |
| 2004/0245410 A1 | 12/2004 | Kisak et al. |
| 2005/0120904 A1 | 6/2005 | Kumar et al. |

* cited by examiner

| Configuration Input | Operational Inputs | End Use Device Outputs | |
|---|---|---|---|
| H | 1 1 0 0 | 1 0 1 0 1 | Mode 1 |
| L | 1 1 0 0 | 1 1 1 0 0 | Mode 2 |

SYSTEM AND METHOD FOR MANAGING EMISSIONS FROM MOBILE VEHICLES

RELATED APPLICATIONS

This application is a continuation-in-part of U.S. patent application Ser. No. 11/008,708 filed on 9 Dec. 2004, now U.S. Pat. No. 7,302,895 titled "Configurable Locomotive".

This application is also a continuation-in-part of U.S. patent application Ser. No. 10/849,314 filed on 19 May 2004, now U.S. Pat. No. 7,131,614 titled "Off Highway Vehicle and Control System", which in turn claims benefit of the 22 May 2003 filing date of U.S. provisional patent application No. 60/474,151.

This application also claims benefit of the 23 Jul. 2004 filing date of U.S. provisional patent application No. 60/590,853 titled "Locomotive Control System and Method".

Each of these previously filed applications is incorporated by reference herein.

FIELD OF THE INVENTION

This invention relates generally to control of emissions from a mobile vehicle.

BACKGROUND OF THE INVENTION

Modern railroad locomotives are complex vehicles containing multiple operating systems including sophisticated computerized controls responsive to a large number of input variables. A typical electro-motive railroad locomotive is propelled by a plurality of AC or DC traction motors connected to respective drive axles, with the electrical energy for the motors being supplied by an on-board generator powered by a diesel engine.

Locomotives are assembled in a number of different configurations so as to satisfy one or more respective mission requirements served by a railroad. One may appreciate that the operational requirements for over-the-road hauling are significantly different than those for switchyard operation. For example, a switcher locomotive generally moves a relatively small number of cars across a mostly flat area at low speeds, whereas road-hauling locomotives must be capable of moving a train at relatively high speeds across terrain that may include significant changes in topography. A switcher locomotive may also spend a significant amount of time idling, whereas road locomotives must operate for long periods at high power levels.

Railroad mission requirements are affected by numerous variables including customer demand, weather, equipment availability, personnel availability, government regulations, etc., and it is often impossible for a railroad dispatcher to make available the best-suited locomotive for a particular mission. For example, even a single mission as simple as moving a train from point A to point B may involve mission demands that vary significantly with the geography of the railroad track, such as different government emission regulations at different points along a railroad track. As a result, a locomotive originally assembled with the configuration suited for an initial intended mission will provide less-than-optimal configuration when placed into service for another and different mission, and typically the best a dispatcher is able to do is to provide a locomotive that presents a good compromise of capabilities to meet a range of different (and often competing) mission requirements.

DETAILED DESCRIPTION OF THE INVENTION

Figure 1:
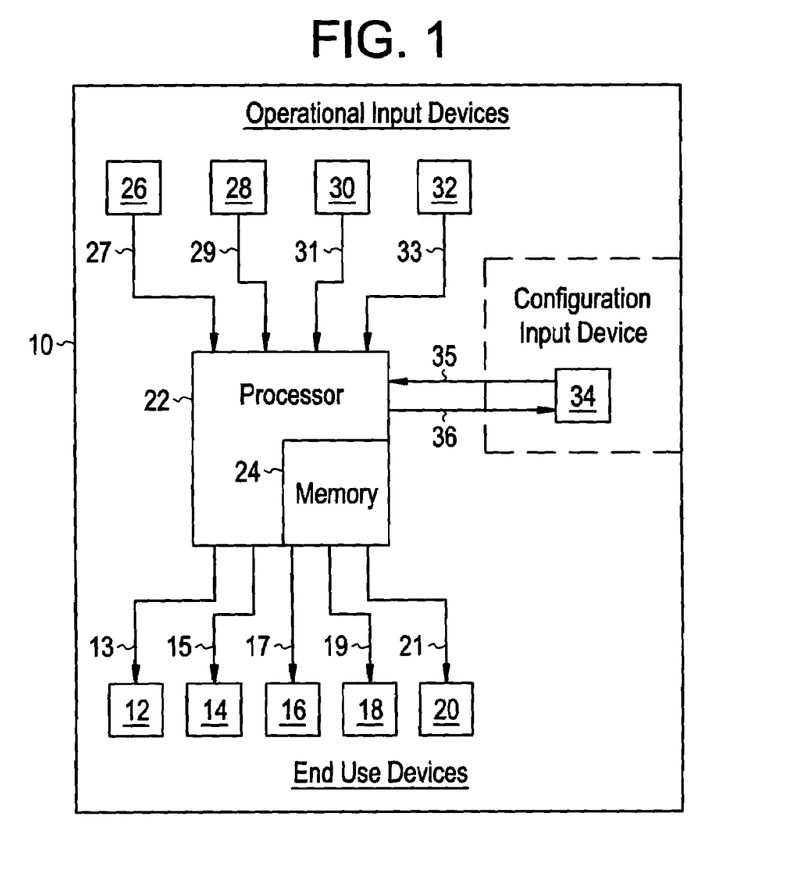
FIG. 1 is a block diagram of a control system of a locomotive including a configuration input.

The applicants of the present invention have discovered that by controlling emissions of locomotive engines relative to geographic locations, management of railroad operations such as emissions monitoring and emissions credit trading may be improved over conventional techniques. FIG. 1 is a block diagram of a control system of a locomotive 10 that can be operated in one of several configurations in order to better match the locomotive 10 to a particular mission. The term configuration is used herein to describe the overall operating profile of the locomotive, including important operating characteristics and the manner in which the operating systems of the locomotive are controlled in response to operational inputs. A locomotive's configuration may include performance variables such as the peak output rating of the locomotive engine, the correlation between the throttle notch settings and the percentage of full power generated, engine emissions curves, acoustic emissions, electro-magnetic emissions, the number of traction motors used, fuel economy performance, adhesion limits, the organization, presentation and functionality of operator controls, communications protocol, auxiliary functions, etc.

The operating systems of a locomotive include a plurality of end use devices 12, 14, 16, 18, 20. The end use devices may include fuel pumps, valves, lamps, semiconductor devices, switches, motors, compressors, resistance grids, energy storage batteries for hybrid locomotives, etc. These end use devices are part of respective operating systems of the locomotive, such as the fuel system, engine cooling system, braking system, diagnostic systems, operator control panels, etc. The end use devices may include elements located off-board the locomotive, such as an off-board planning or reporting element, for example. A computing device such as a processor 22, executing operating instructions stored in a memory 24, is used to control the end use devices via end use device control signals 13, 15, 17, 19, 21. A plurality of operational input devices 26, 28, 30, 32 are in communication with the processor 22 to provide a respective plurality of input signals 27, 29, 31, 33 to the processor. The input devices may be sensors, systems or other components located primarily onboard the locomotive, and in some embodiments, off-board of the locomotive. The stored instructions are programmed so that the end use devices are controlled in a predetermined manner in response to the operational inputs. Thus, the instructions executed by processor 22 operate as a transfer function to convert a set of input signals 27, 29, 31, 33 to a set of output signals 13, 15, 17, 19, 21.

In a prior art locomotive, the relationship between each possible set of operational input states and the respective mode of control of the end use devices (i.e. the transfer function implemented by the computing device) is fixed in accordance with the configuration of the locomotive. In contrast, the locomotive 10 of FIG. 1 includes a configuration input device 34 different from the operational input devices (26, 28, 30, 32) connected to the processor for generating a configuration input signal 35, with the configuration input signal 35 having at least two state sets and being different from the input signals (27, 29, 31, 33). The computing device 22 of FIG. 1 includes executable instructions that allow the relationship between at least one of the possible sets of operational input states (i.e. one set of values of 27, 29, 31, 33) and the respective mode of control of the end use devices (i.e. the set of values of 13, 15, 17, 19, 21) to be varied in response to the value of the configuration input signal 35. In other words, the processor 22 may be configured to operate as two or more different transfer functions, with the selection of the transfer function being responsive to the configuration input signal 35. Thus, a locomotive 10 with two or more distinct configurations may be provided, such as two or more different emissions profiles. Note that FIG. 1 illustrates the configuration input device 34 as being on-board the locomotive 10; however the dotted lines are meant to illustrate an embodiment where the configuration input device 34 may be located off-board of the locomotive 10, with the configuration input signal 35 being provided to the locomotive 10 via a suitable communication link, such as train lines or wireless communications.

Figure 2:
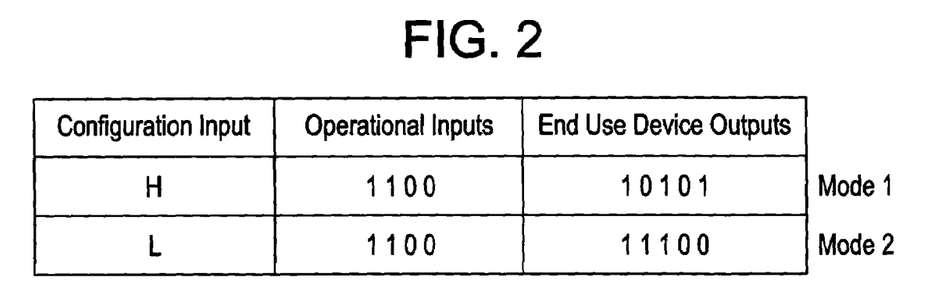
FIG. 2 is a table illustrating the relationship between control system inputs and outputs for two configuration modes of the locomotive of FIG. 1.

This concept is illustrated in the table of FIG. 2, where two different modes of operation are illustrated for two different configuration input state sets. When the configuration input 35 has a high value H and the four operational inputs 27, 29, 31, 33 have values of 1, 1, 0 and 0 respectively, processor 22 will implement a first transfer function to produce output signals 13, 15, 17, 19, 21 having respective values of 1, 0, 1, 0, and 1 to control the five end use devices. This relationship is in accordance with a first configuration of the locomotive, such as when operating under a first emissions limit. In contrast, when the configuration input 35 has a low value L and the four operational inputs 27, 29, 31, 33 have those same values of 1, 1, 0 and 0 respectively, processor 22 will implement a second transfer function to produce output signals 13, 15, 17, 19, 21 having respective values of 1, 1, 1, 0 and 0, thereby controlling the five end use devices differently than in the first mode. This relationship is in accordance with a second configuration of the locomotive, such as when operating under a first emissions limit, different than the first configuration. The difference in the control signals provided to the end use devices 12, 14, 16, 18, 20 between these two modes allows the locomotive to be configured in two different ways in response to the configuration input variable. One skilled in the art will appreciate that the control system and variable states used in the illustration of FIG. 1 and 2 are illustrative only and are purposefully simplistic. Modem locomotive embodiments may literally include hundreds of such inputs and outputs, including more than one configuration input variable, and including both analog, digital, neural network and/or fuzzy logic circuitry. Portions of the processing may be accomplished off-board of the locomotive and communicated to an on-board device for further processing or direct end use device control. Furthermore, the processor 22 may be configured to provide an input signal 36 to the confirmation input device 34, such as feedback from a learning function used to modify an input behavior. In one embodiment, a time series infinite polynomial Taylor function may be used to modify a sensor function. A learning function implemented by processor 22 may further learn in a first manner in one configuration and in a second manner in a second configuration. A distributed learning function may be accomplished on-board the locomotive in real time in order to provide improved performance over prior art devices.

By way of example, a fuzzy logic controller (FLC) may be a knowledge-based system in which the knowledge of locomotive operators, locomotive engineers or knowledge gained from a fleet of locomotives has been used to synthesize a closed loop controller for the locomotive. Such FLCs are typically derived from a knowledge acquisition process, but may be automatically synthesized from a self-organizing control architecture. It will be appreciated that the locomotive sensors used by an FLC may be less expensive and may require relatively less precision than the sensors used by a traditional non-fuzzy controller due to the distinct granularity level with which the control laws may be processed by the FLC. It will be further appreciated that fuzzy logic may be used in a locomotive to make decisions and provide measurement and/or control outputs based on one or more inputs of an analog nature in accordance with a set of inferencing rules. Fuzzy logic can make "best guess" decisions in circumstances where input data is incomplete and/or inconsistent. It is contemplated that a FLC can enable the owner of a fleet of locomotives to customize locomotive operation for any given application. Locomotive parameters may be stored in a suitable memory, and control functions may be performed in control logic. Thus, the owner may readily update the information on a computer and download updated locomotive parameters to individual locomotives. A portable receiver/transmitter may be utilized to transfer information to the locomotive controller by way of a communications link. It is further contemplated that one may use a reconfigurable fuzzy logic controller which may be general purpose, yet have a functionality that may be readily adjusted in accordance with the type of locomotive and/or locomotive application. For example, the core structure of the fuzzy logic controller may be virtually identical for a myriad of locomotive applications. However, application-specific definitions of both fuzzy logic membership functions and/or fuzzy logic rules may be input to the controller as a set of parameters, such that the fuzzy logic controller is programmably reconfigurable without changing the actual fuzzy logic. In one exemplary embodiment, a configurable locomotive embodying aspects of the present invention may include a fuzzy logic processor configured to generate one or more transfer functions or executable instructions for relating the input signals to the output control commands during a given configuration mode. For readers desirous of general background information regarding fuzzy logic controllers reference is made to U.S. Pat. No. 6,760,712, titled "Automatic Train Handling Controller, U.S. Pat. No. 6,078,911, titled "Compilation of Rule Bases For Fuzzy logic Control", and U.S. Pat. No. 5,647,231 titled "Appliance Electronic Control System with Programmable Parameters including Programmable and Reconfigurable Fuzzy Logic Controller", each assigned in common to the assignee of the present invention.

By way of example, a neural network controller may comprise at least one neural network estimator for generating one or more estimated transfer functions. Typically, the neural network estimator may be coupled to receive selected sensed locomotive operating parameters from various sensors, such as speed, emissions, notch level, tractive effort, etc., to generate an estimated transfer function that may be coupled to an actuator system. In another example, the neural network estimator can be coupled to receive inputs from processors generating computed values of locomotive operating parameters (e.g., from other neural networks, fuzzy logic controller, or locomotive models programmed in a processor of the controller) in addition to sensed parameters.

The neural network estimator may be a nonlinear estimator that can be trained to map a selected range of input signals so as to generate a desired output parameter that varies in correspondence with the input signals. The neural network estimator may typically comprise an input neuron layer and at least a first hidden neuron layer. Multiple hidden neuron layers, e.g., through an nth hidden neuron layer, may be coupled together, with the nth hidden neuron layer being coupled to an output neuron layer. By way of example, biasing means (such as a power supply that provides a stable, determinable power level or any other suitable biasing device) may be coupled to each neuron layer of the neural network estimator to provide a means to adjust the transfer function of the controller, e.g., a squashing function, or the non-linear characteristic function for respective neurons in a layer. Signals passed from each layer to the next may be processed by applying respective weights (associated with each respective neuron) to each signal passing from the neuron. The respective weights for each layer may be determined in a training sequence using techniques readily understood by one skilled in the art. For example, during training of a neural net, prescribed patterns of input signals may be sequentially and repetitively applied, for which patterns of input signals there may be corresponding prescribed patterns of output signals known. The pattern of output signals generated by the neural net, responsive to each prescribed pattern of input signals, may be compared to the prescribed pattern of output signals to develop error signals, which are used to adjust the weights as the pattern of input signals is repeated several times, or until the error signals are detected as being negligibly valued. Then training may be done with the next set of patterns in the sequence. During extensive training the sequence of patterns may be recycled. In one exemplary embodiment, a configurable locomotive embodying aspects of the present invention may include a neural network processor configured to adjust, e.g., over a training period or sequence, one or more transfer functions or executable instructions for relating the input signals to the output control commands. For readers desirous of general background information regarding neural network controllers reference is made to U.S. Pat. No. 5,167,008 titled "Digital Circuitry For Approximating Sigmoidal Response in A Neural Network Layer" and U.S. Pat. No. 5,857,321 titled "Controller with Neural Network For Estimating Gas Turbine Inter Cycle Parameters", each assigned in common to the same assignee of the present invention.

It will be appreciated that one may make use of optimal control techniques as a tool in the design of a multivariable locomotive controller. One should be cognizant that achieving an all-encompassing true "optimal" design may not be realistic since in a practical implementation achieving a partially optimal design should be considered a success. For example, it is contemplated that such a design will make coordinated use of all input, output and control variables, and will be organized to ensure a stable locomotive controller that can be logically changed (e.g., reconfigured) to meet a set of desired performance objectives for the locomotive. In one exemplary embodiment, optimal control techniques may be attractive since such techniques can readily handle multi-input systems and allow the designer to quickly determine appropriate candidate values for a control law matrix. As will be recognized by those skilled in the art, in general, one would not have available all possible system states for performing a given control strategy. For example, it may be neither practical nor necessary to install a sensor for sensing every possible locomotive state since one can provide an estimator for estimating any missing states rather than sensing or measuring every possible locomotive state. In one exemplary embodiment one may make use of optimal estimation techniques as a tool in the design of a multivariable locomotive estimator that may be used in conjunction with the locomotive controller. One example of an optimal estimation technique may be a time-varying optimal estimation solution, commonly referred in the art as the "Kalman filter". Essentially, the optimal estate solution in this case is given by a recursive weighted least-square solution. For readers desirous of general background information regarding various control techniques reference is made to textbook titled "Digital Control of Dynamic Systems" by Gene F. Franklin and J. David Powell, 2nd printing 1981, published and copyrighted by Addison-Wesley Publishing Company.

In one embodiment of the present invention the configuration input signal 35 may be responsive to geographic location of the locomotive 10. The location of the locomotive may be determined using an appropriate input device 34, such as a global positioning system (GPS) or a wireless wayside automatic electronic identification (AEI) tag, for example. Alternatively, the configuration input signal 35 may be indicative of the health of the locomotive, such as may be derived from on-board or off-board equipment, including diagnostic and/or control systems. Alternatively, the configuration input may be responsive to an operator input, such as when the configuration input device 34 is an operator-controlled switch, computer mouse, touch screen, keyboard, identification card reader, bar code reader, etc., with or with the requirement for a password or key. In addition to the operator being located on board the locomotive, configuration of the locomotives may be effected from a location adjacent to the locomotive such as at a railyard control tower, or remote from the locomotive such as from a remote data center or dispatch office. In one embodiment, a signal indicative of the health of one locomotive of a consist may be used to reconfigure a second locomotive in the consist; for example, when a maximum power generating capacity of the first locomotive becomes degraded, the second locomotive may be reconfigured to a higher peak power level to make up for power lost from the first locomotive. In another embodiment, a signal indicative of an emission limit may be received from a central emission control center and may be used to configure the vehicle to operate within that emission limit. The configuration input may alternatively include a device that changes an analog or digital signal; for example, altering, adding or deleting a message, changing a message sequence, or offsetting a sensor signal to cause the locomotive 10 to operate in a different configuration.

In another embodiment, the configuration input may be responsive to an operator input. For example, an operator of the locomotive may implement a different configuration upon identifying that the locomotive is entering a different area having different configuration requirements, such as by recognizing a milepost marker or other rail side indicia, indicative of a boundary of the different area. In another embodiment, configuration inputs for changing a configuration may be pre-programmed based on distance of the locomotive from a different operation area. For example, an operator may input a distance from a present location of the locomotive to a different operational area. Then, based on a sensed distance traveled, the locomotive may automatically change its operating configuration upon traveling the distance to arrive at the different area.

Figure 8:
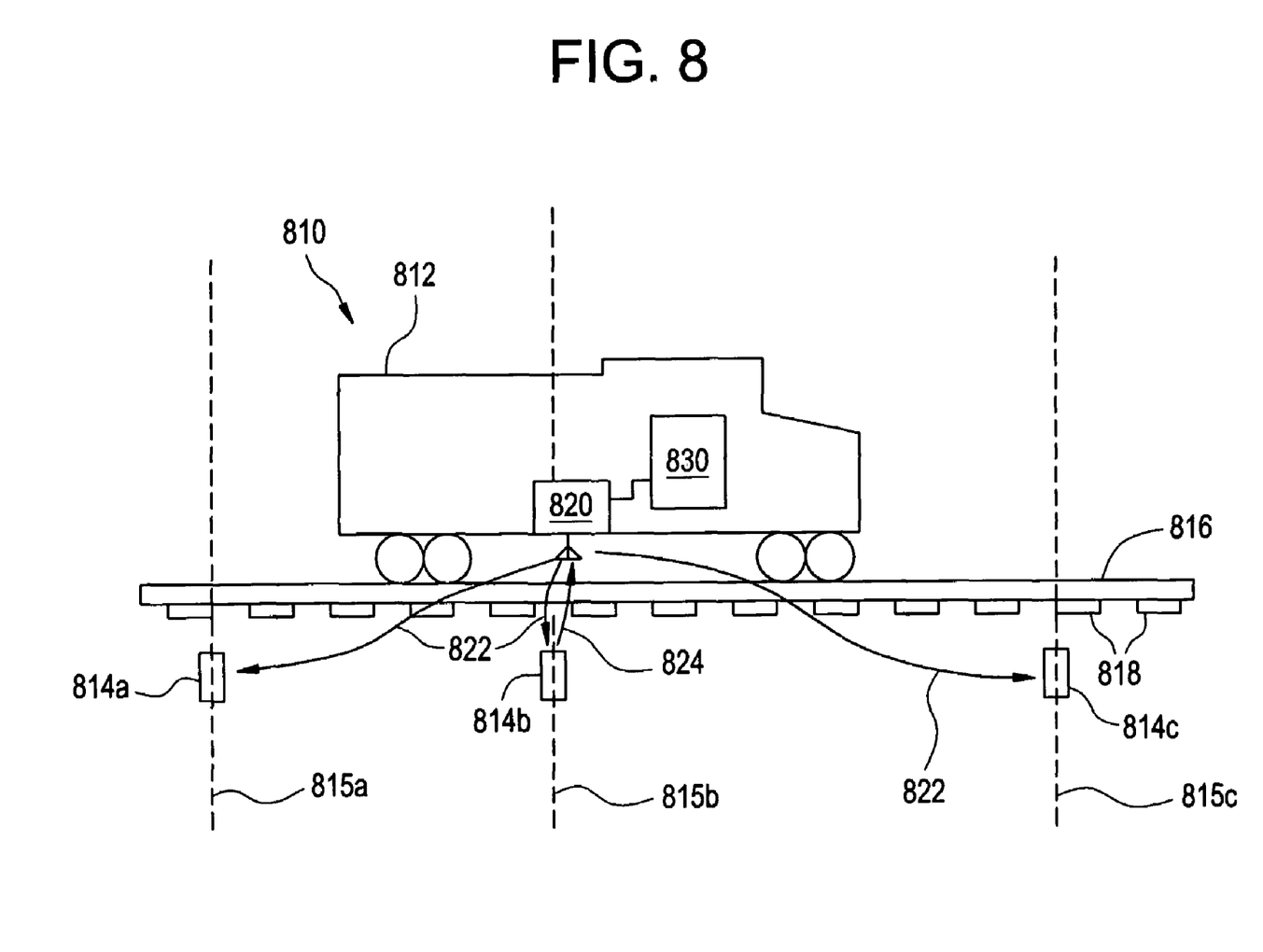
FIG. 8 is an illustration of operating a locomotive as a function of the location of the locomotive according to one embodiment of the invention.

FIG. 8 shows a system 810 for controlling a locomotive operating condition, such as an emission parameter, in response to information encoded in transponders 814a, 814b, 814c positioned along the track 816. For example, the transponders 814a, 814b, 814c may be positioned at predetermined boundaries 815a, 815b, 815c to identify the boundary to a locomotive 812 passing the boundary 815a, 815b, 815c. Transponders 814a, 814b, 814c, such as AEI tags (commercially available, for example, from Transcor, Incorporated) may be positioned in the bed of the track 816 at a location where a locomotive operating condition is desired to be controlled. The transponder 814 may be attached to a tie 818 located at an entrance to a rail yard area to limit the speed of locomotive 812. The locomotive 812 may be equipped with a transponder reader 820 to read the information encoded in each transponder 814a, 814b, 814c that locomotive 812 passes while traveling along the track 816. While the following describes a reader 820 located on the locomotive 812, it should be understood that the reader 820 may be installed on any car or locomotive on a train. In some instances, the locomotive 812 operates without an attached car or another locomotive, and thus the locomotive 812 itself then constitutes the train. The reader 820 may be configured to provide control information read from a transponder 814a, 814b, 814c to a controlling locomotive of the train, or to a remote control operator.

In one embodiment, the reader 820 may radiate a radio frequency (RF) activation signal 822 that is received by the transponder 814b. The activation signal 822 provides sufficient energy to the transponder 814b to allow the transponder 814b to radiate a transponder signal 824 back to the reader 820. The transponder signal 824 may typically be an RF signal having a frequency different than that of the activation signal 822. The transponder may also be powered by another suitable source of power, such as batteries, solar power, or a line to a power source. Typically, the reader must be located within a suitable detection distance from the transponder, for example, within 10 feet, to receive the transponder signal 824. Accordingly, transponders may need to be spaced at distances greater than such detection distance to prevent interference among transponders. Unique identifiers for the communication of each transponder with the reader may also be used to allow for closer spacing of transponders.

The reader 820 is in communication with an onboard control system 830, such as a locomotive control unit (LCU) that controls the locomotive 812. After reading a transponder, the reader 820 provides the control information encoded in the transponder signal 824 to the onboard control system 830 to control the operating parameters of the locomotive 812. The locomotive 812 may then maintain these same operating parameters until another transponder 814c is passed, and new control information is received. The control information received from each transponder 814a, 814b, 814c may be directly provided to the onboard control system 830 for automatic control of the locomotive 812.

In an aspect of the invention, two or more sequentially positioned transponders may be configured to provide control information dependent on the direction of locomotive travel with respect to the transponders. For example, transponder 814a may comprise a pair of transponders positioned at the boundary 815a to provide control information to control the operating parameters of the locomotive 812 depending on a direction of travel along the rail, such as if the locomotive 12 is entering or leaving an area 817 bounded by the boundary 815. A boundary may include a state line between two states requiring different emission profiles. As the locomotive 812 detects leaving one state and entering an adjacent state by passing, for example paired transponders in a certain direction, the locomotive 812 may be instructed to change an emissions parameter corresponding to the requirements of the state it has just entered. In another aspect of the invention, the reader 820 may be mounted on a different locomotive or rail car of a train of which the locomotive 812 is a member. For example, the locomotive 812 being controlled may be a member of consist of a train, wherein the different locomotive is also a member of the consist. The different locomotive detects its location and transmits the location information to the locomotive 812 for controlling the locomotive's 812 emissions responsive to the location information provided by the different locomotive.

One or multiple aspects of the locomotive's performance may be altered to change the locomotive's configuration in response to a change in the configuration input. In one embodiment, the locomotive may be reconfigured from a first horsepower rating to a second horsepower rating in response to a configuration input change. Consider an example where a taxing authority levies a tax that increases with the size/power rating of the locomotive. If a railroad needs a 5,000 horsepower locomotive to move a train through the region of that taxing authority, but has available only a 6,000 horsepower locomotive to perform this mission, then the 6,000 horsepower locomotive could be reconfigured to a 5,000 horsepower mode for this mission in order to avoid paying an excessive amount of taxes. This change in configuration may be accomplished in response to an operator selection as the configuration input variable, or alternatively it may be performed automatically in response to a configuration input responsive to location as the locomotive approaches the geographic region of concern. The peak power level configuration change may involve instructions executed by the processor to change the response of end use devices in the throttle and/or fuel delivery systems of the locomotive. The power output of the engine delivered in response to at least one of the throttle notch setting is changed between the two configurations. This may be accomplished, for example, by including instructions executable by the computing device to recognize X notch settings (typically 8 power notch settings are available) in a throttle input device when the configuration input has a first value and to recognize more or less than X notch setting in the throttle input device when the configuration input has the second value. In a typical North American locomotive, the throttle divides the power range into notches 1 through 8, all eight of the notch settings may be recognized in the first (6,000 horsepower) configuration. In the second (5,000 horsepower) configuration such as used for non-North American locomotives may have as many as 15 notch settings, the throttle control system would recognize a notch 15 input, but rather would maintain the end use device outputs for notch 15 to be the same as the end use device outputs for the previous notch 8 setting. Thus, the exact same set of operational input variable values (e.g. throttle set to notch 8) will produce two different sets of end use device control output values (e.g. fuel injection valve actuation timing) as a result of the respective change of the configuration input value. Alternatively, in the first configuration the fuel system may provide fuel to all X cylinders (typically 8, 12 or 16 cylinders) of the diesel engine, while fuel may be provided to less than X cylinders in the second configuration, thereby accomplishing a reduction in the peak engine power output.

Another embodiment of the invention may change the number of traction motors that are powered in the locomotive or the power level setting of the traction motors. In a first configuration, every traction motor on the locomotive may be powered, such as would be needed for normal open road load hauling missions. In a second configuration, fewer than all of the traction motors may be powered. This may be accomplished using instructions executable by the computing device to permit the powering of X traction motors of the locomotive when the configuration input has a first value and to permit the powering of less than X traction motors of the locomotive when the configuration input has a second value. Similarly, the power level of the active traction motors may be varied in response to a configuration input variable.

The present invention may be utilized in a locomotive consist where a plurality of locomotives are joined together to pull a train. All of the locomotives in a consist are typically controlled by a single engineer from a lead locomotive, with the trailing locomotives being in communication with the lead locomotive and responding to the engineer's input. Each locomotive exhibits a maximum adhesion limit, i.e. the amount of power that can be applied to the wheel of the locomotive before wheel slip will occur. If all of the locomotives are not of the same type and therefore do not all have the same adhesion limit, situations can arise where uncontrolled wheel slip may occur if the lead locomotive has a higher adhesion limit than a trailing locomotive. One embodiment includes instructions executable by the computing device to operate an engine of a locomotive below a first adhesion limit when the configuration input has the first value and to operate the engine of the locomotive below a second adhesion limit less than the first adhesion limit when the configuration input has the second value. In this manner, a lead locomotive having a higher adhesion limit than a trailing locomotive may be reconfigured to operate as if it had the same adhesion limit as the trailing locomotive, thereby eliminating problematic wheel slip concerns. The configuration input signal 35 may be responsive to any operating parameter of another locomotive in the train. For example, a signal indicative of the power level or of the health of a trailing locomotive may be used as a configuration input signal 35 for reconfiguring a lead locomotive to a respective peak power level responsive to the signal 35.

The control systems of a locomotive may be programmed to respond in accordance with a predetermined set of mission priorities. For example, the mission priority for an express road locomotive may be to maintain the desired power output in order to ensure that a desired train speed is sustained so that an express delivery schedule can be satisfied. There may be situations where doing so may cause excessive wear, excessive emissions or other undesirable effects. For example, if one cylinder of the diesel engine becomes inoperative, the predetermined mission priorities will determine whether the locomotive control system will provide additional fuel to the operating cylinders to compensate for the inoperative cylinder. Doing so may result in the engine exceeding an emission limit or may cause excessive wear on the engine. For a non-express service locomotive, the mission priority may be to operate at all times within an emissions limit, or within a required fuel consumption limit, etc. For such non-express service, the mission priorities may simply allow the peak engine output to drop when one engine cylinder becomes inoperative. The present invention may be utilized to allow a single locomotive to be reconfigured from a first set of mission priorities to a second set of mission priorities in response to a change in value of a configuration input. Such a change may involve modifying many end use device output responses, including diagnostic and alarm systems. Such changes are impractical for prior art locomotives, and thus mission priorities are sometimes compromised based upon the selection of an available locomotive. The present invention provides additional flexibility for a railroad dispatcher in matching available equipment with mission requirements.

In another embodiment, the configuration of an operator interface device may be changed in response to a configuration input variable. For example, different owners or operators may use various administrative and/or technology schemes, such as different emission profiles, different operator training profiles, usage profiles, tractive effort profiles, distributed power techniques, controlled tractive effort (CTE) profiles, radio communication frequencies, etc., that may be reflected in an operator interface device such as a touch screen input device. When attempting to operate a prior art locomotive on more than one railroad, problems would be encountered if the locomotive configuration were inconsistent with the mode of operation of the railroad. A simple example is the manner in which a railroad numbers the milepost markers along a rail line —some railroads use numbers and some railroads use letters. Another example is the manner in which a railroad configures its wireless radio communications between multiple locomotives in a train consist. With the present invention, a locomotive may include appropriate hardware and software to function properly on a plurality of railroads, with the activation of the proper configuration for a particular railroad being responsive to a configuration input variable such as an operator's selection. The operator input may include the operator's identity, such as by keying an operator identification number into a keyboard, swiping an identification card through a card reader, etc. The operator identity may be used as a configuration input variable, for example automatically limiting the power level, geographic region of operation, or configuration of locomotive interface devices in only those modes for which a particular operator has appropriate permissions.

As another embodiment of the invention, the computing device 22 may control one or more operations of the locomotive as a function of an emission profile, with the emission profile being made responsive to the configuration input value. An emission profile may be an operating profile that describes and defines the desired emissions performance of the locomotive verses power output. For example, an emissions profile may include one or more emissions requirements, such as a maximum allowable value of an emission. An emission requirement may set a maximum value of an oxide of nitrogen (NOx) emission, a hydrocarbon emission (HC), a carbon monoxide (CO) emission, and/or a particulate matter (PM) emission. Other emission limits may include a maximum value of an electromagnetic emission, such as a limit on radio frequency (RF) power output, measured in watts, for respective frequencies emitted by the locomotive. An emission requirement may be variable based on a time of day, a time of year, and/or atmospheric conditions such as weather or pollutant level in the atmosphere. It is known that emissions regulations may vary geographically across a railroad system. For instance, an operating area such as a city or state may have specified emissions objectives, and an adjacent operating area may have different emission objectives, for example a lower amount of allowed emissions or a higher fee charged for a given level of emissions. Accordingly, an emission profile for a certain geographic area may be tailored to include maximum emission values for each of the regulated emission including in the profile to meet a predetermined emission objectives required for that area.

The selection of a locomotive for a mission is complicated if the route crosses multiple areas with differing emissions requirements. In other embodiments, the emission profile or emission objective/characteristic may be defined as a function of the time of day, weather, daily emission rating/classification, train pull weight, consist configuration, movement plan, rail conditions, age or type of locomotive, and/or business objective of the railway system operator. An emission parameter of an operating locomotive may be compared to the emission profile for a particular area. A process executed by the computing device 22 is used to determine if an adjustment to one or more operating characteristics of the locomotive is required. The emission profile may be associated with a gaseous, liquid, or solid byproduct of combustion, with an acoustic energy emission, a reflective emission, such as provided by a device for reflecting or absorbing electromagnetic energy, vibration emissions, and/or an electromagnetic energy emission, such as radio, infrared, and visible light emissions. For example, if the monitored emission parameter is a chemical or gas output of the diesel engine and it is monitored as being higher than specified by the emission objective, the computing device may execute instructions to control engine/fuel system end use devices such as to change the engine timing or fuel delivery schedule or another control intended to reduce the emissions being generated by the engine. Other corrective actions may include shutting down the engine, adjusting locomotive assignments within a consist or a train, adjusting one or more movement plans for a train, changing engine cooling, changing engine load or tractive effort, changing the engine speed, utilizing hybrid energy for motoring, or storing hybrid energy in an energy storage system. Such action may be taken to achieve the emission characteristic for a particular locomotive or may be taken on a system wide or sub-system basis in order to achieve an emission objective for a fleet of locomotives and trains operated by a railway systems operator operating in one or more operating areas.

In one embodiment, the present invention provides a method and apparatus for managing the emissions configuration of one or more locomotives depending upon a configuration input variable 35, such as the location in which the locomotives are located. For example, if a first operating area is an emission control area requiring a specified emission characteristic, the computing device 22 manages the operation of the locomotive (i.e. control outputs 13, 15, 17, 19, 21) in accordance with a first emission profile that will satisfy that objective when a location configuration input has a first value. When the configuration input 35 changes value in response to movement of the locomotive into a second operating area having a different emissions objective, the computing device controls the operation of the locomotive in response to a different emission profile, i.e. at least one different output value 13, 15, 17, 19, 21 for the same set of input values 27, 29, 31, 33.

Figure 3:
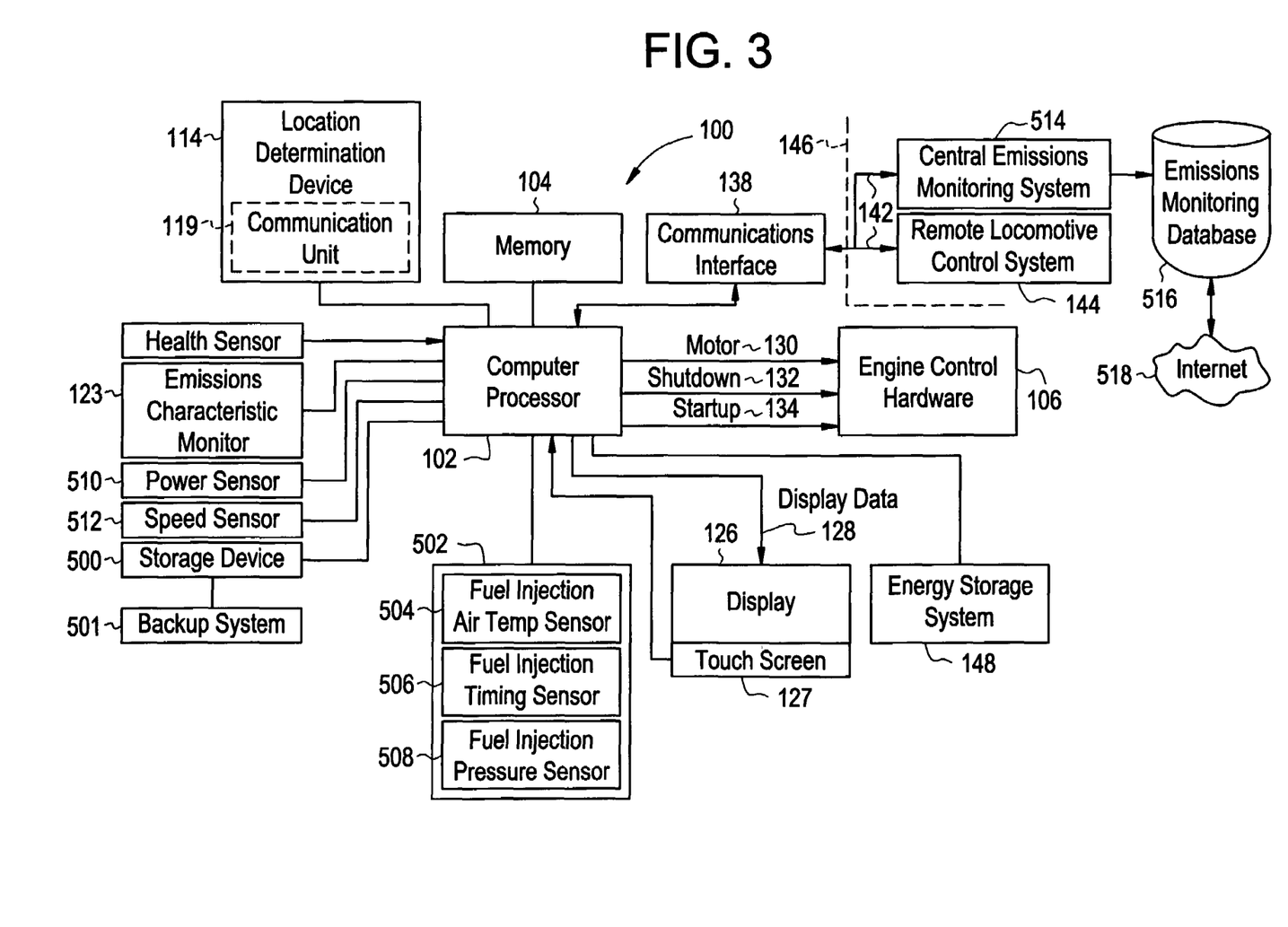
FIG. 3 is a block diagram of a locomotive control system in accordance with one aspect of the present invention.

In an aspect of the invention illustrated in FIG. 3, a locomotive control system 100 may include an emission characteristic monitor 123 coupled to a computer processor 102 and monitoring emissions exhausted by the locomotive, such as oxides of nitrogen (NOx), carbon monoxide (CO), carbon dioxide (CO2) and particulates. The system 100 may also include an emission operating parameter monitor 502 coupled to the computer processor 102, for monitoring locomotive operating parameters indicative of emission profiles. The emission operating parameter monitor 502 may further include a fuel injection air temperature sensor 504, a fuel injection timing sensor 506, and a fuel injection pressure sensor 508 for monitoring these respective parameters. As known, such parameters may be used to calculate an emission level of a monitored engine. In another aspect, a horsepower, (or equivalent power measurement, such as megawatt-hours) produced by the locomotive and a speed of the locomotive may be monitored, for example, at certain times (such as every 0.1 hour) and/or at certain locations by power sensor 510 and speed sensor 512, respectively. As is known, such horsepower and speed information may be used to calculate an emissions profile of the locomotive over the period that such information is recorded. The emission profile may be correlated to location information to show where the locomotive was located when producing the emissions profile. Other parameters, such as fuel usage and engine exhaust characteristics may be monitored for example, by a fuel usage sensor and an engine exhaust characteristic sensor, respectively.

The locomotive control system 100 is in communication with a central emissions monitoring system 514. The central emissions monitoring system 514 may be coupled to a central emission monitoring database 516, such as a central database used to monitor locomotive parameters as described in U.S. Pat. Nos. 6,301,531 and 6,263,265. The central emission-monitoring database 516 may have secured accessibility, for example, via the Internet 518. The central emissions monitoring system 514 may receive emission information from one or more locomotives over secure communication link 142 to track emissions of respective monitored locomotives. In an aspect of the invention, emission information provided by each locomotive may be stored in the database 516 in addition to, or instead of, being stored locally on the storage device of the locomotive. The information may be provide to the central emissions monitoring system 514 as the information is acquired, or the information may be uploaded from the locomotive on a periodic basis.

Advantageously, the system 100 provides an ability to operate a locomotive within different emission profile configurations (such as within a Tier II NOx limit) while in different regions. The system 100 may be configured to operate automatically with no operator input required to transition the locomotive to a different emission profile configuration. The system may be programmed to limit interruption of the locomotive performance while transitioning to a different emission profile configuration. The system 100 provides the ability to record and maintain a record of the date and time that a locomotive enters and exits a pre-defined region, and/or a record of various system operating parameters, such as parameters indicative of emission generated by the engine, for example. Memory 104 may be used to record portions (e.g. as measured by clock time, fuel consumed, location, etc.) of the locomotive operation in each available mode of operation, such as may be useful for subsequent tax reporting, billing or fleet management purposes.

In addition, no modification of engine control hardware is necessary. In the event of a malfunction of the configuration input device 34 (i.e. the location determination device 114), the system 100 may instruct the locomotive to revert to a default emissions profile, alternatively, the emissions profile of the last known configuration input may be used. Data may be redundantly stored or backed up and time stamped at periodic intervals. The configuration of the locomotive may be changed in response to a configuration input signal 35 that originates from the off-board central emissions monitoring system 514, such as when the emission data for the fleet or for the particular locomotive 100 requires or allows a change in the emission profile for the locomotive. Alternatively, the configuration of the locomotive may be changed by operator input, such as via input to a touch screen device 127.

In an aspect of the invention, the stored emissions information for each locomotive may be made available to a regulatory taxing agency, such as a taxing authority or environmental regulation authority, to verify emission compliance while the locomotive, or a fleet of locomotives, is operating in a certain area. Emission information may be provided for a locomotive as it crosses a boundary of a predefined region, and/or provided for the period of time that the locomotive operates within the region may be provided. For example, a state may require a certain emissions profile be maintained while a locomotive is operating with in the boundaries of the state, and may require reporting of emission information for each locomotive. The system 100 allows such reporting to be easily provided and may be made available to a regulatory agency of the state via the Internet.

In another embodiment, emissions from a plurality of mobile vehicles of a fleet may be measured, and data responsive to the measured emissions communicated to a central database. The received data may then be processed relative to a fleet emission requirement. The received data may be used to generate an operating instruction for operating the fleet in compliance with the emission requirement. The operating instructions may then be communicated to at least one mobile vehicle of the fleet. In an embodiment, the operating instruction may include a command to adjust an emission output. In another embodiment, an actual emission of each of the mobile vehicles versus a corresponding emission requirement for each of the mobile vehicles may be measured to calculate a difference between the actual emission and the corresponding emission requirement. The differences may then be summing over the fleet to determine fleet compliance with the fleet emission requirement. A plurality of emission requirements may be in effect for a respective plurality of geographic areas over which the fleet operates. Accordingly, the data may be processed relative to a respective emission requirement in effect for a geographic area in which a respective vehicle is operating.

The emission information gathered may be used for planning purposes for operation within emission controlled regions that allow accumulation of emission "credits" for operating at emission levels below maximum allowed emission levels. For example, emission credits generated by operating below maximum allowed emissions may be accumulated and applied to offset penalties that may be assessed for other locomotives operating above maximum allowed levels, so that overall fleet emissions in the region may be averaged to meet an emission requirement. For planning purposes, if a surfeit of credits has been built up, locomotives may be scheduled to operate in more fuel efficient modes that may generate emissions exceeding a maximum allowed level until the accumulate credits are exhausted. In an embodiment, credits may be traded among different rail road systems operating in different areas, such as different states and different countries. In yet another aspect, the emission information may be used to trade emission credits for the same locomotive being operated within a geographical area having an associated emission requirement. For example, while descending a grade in the operational area, the locomotive may be controlled to have an emission below a maximum allowed emission level for that area. During this time, emission credits may be accrued and these credits may be used to offset operations when an emission parameter is allowed to exceed a maximum value, such as when the locomotive is climbing a grade. Consequently, an average emission of the locomotive while in the area may be managed so that the average emission meets an emission requirement associated with the area.

An exemplary embodiment for a train utilizing multiple locomotives in a consist will now be described with reference to FIGS. 4-7. A propulsion system controller 610 (PSC) onboard each locomotive may be responsive to tractive-effort control signals generated in response to commands wirelessly communicated with locomotive communication equipment 612 (e.g., referred to in commerce as LOCOTROL® Distributed Power Communication Equipment) from a lead locomotive 614 relative to a remote consist 616. By way of example, consist 616 is shown to be made up of a remote locomotive 620 and a trail locomotive 622. It will be appreciated that the present invention is not limited to the consist arrangement shown, since many other consist arrangements may be provided depending on the specific train application. As will be described below, respective controllers on-board each locomotive, such as distributed power controller (DPC) 624, primary locomotive controller 626 (CAX), the PSC controller and the communication equipment may be configured with appropriate control algorithms to selectively limit the tractive effort provided by each locomotive of a consist upon receiving a configuration input signal.

Figure 5:
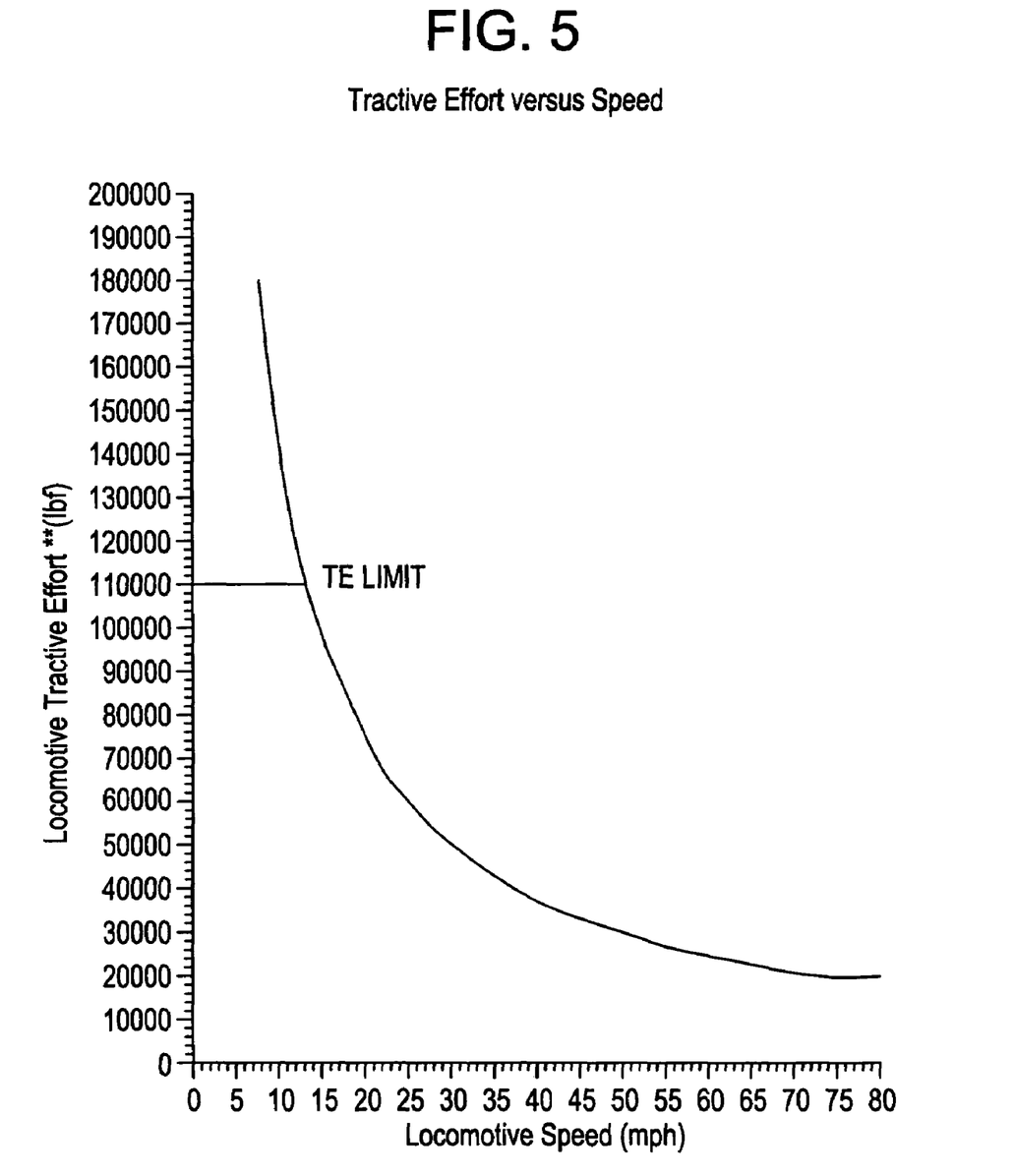
FIG. 5 is an exemplary plot of tractive effort as a function of locomotive speed for a locomotive with selectably controllable tractive effort.
Figure 6:
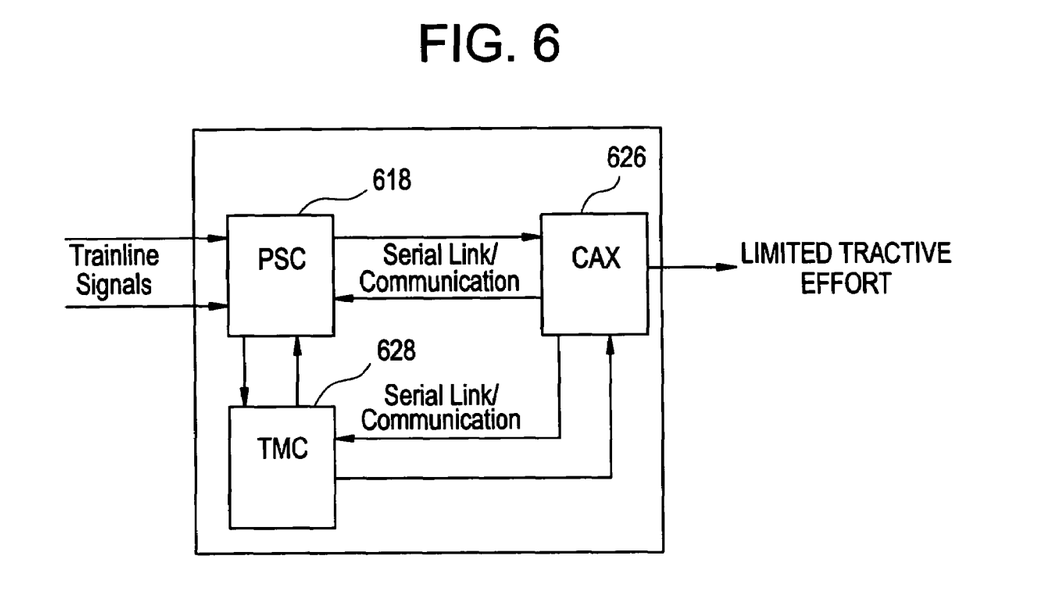
FIG. 6 is a block diagram of controllers providing selectable control of tractive effort for a locomotive.

In one exemplary embodiment, a locomotive controller upon receiving a configuration input signal directs a pair of locomotive train lines (such as lines T/L 618 and T/L 619) be energized (High) for limiting the total tractive effort of the locomotive to a value lower than the locomotive was originally designed to provide. As shown in FIG. 5, in an exemplary embodiment, the locomotive may be selectively limited to approximately 110,000 pounds of tractive effort for all six wheel-axles instead of the normal 180,000 pounds of tractive effort. In the exemplary embodiment, the communication equipment may be configured by way of the DPC controller onboard the remote locomotive to energize the train lines to initiate the limited tractive effort (TE) mode of operation. In one exemplary embodiment, the PSC controller 610 would detect when both train lines are active and interpret this condition as a command for limited tractive effort operation. A reduced tractive effort command would then be imposed on the respective traction motor controllers (TMC) 628, as illustrated in FIG. 6. Alternatively, the tractive effort of the lead locomotive could be increased relative to the remote locomotive so that a differential in tractive efforts is developed between the lead and remote locomotives in a LOCOTROL distributed power train. This differential helps keep unevenly loaded railroad cars in a train on the railroad track when the train encounters curvy and hilly track conditions.

Figure 4:
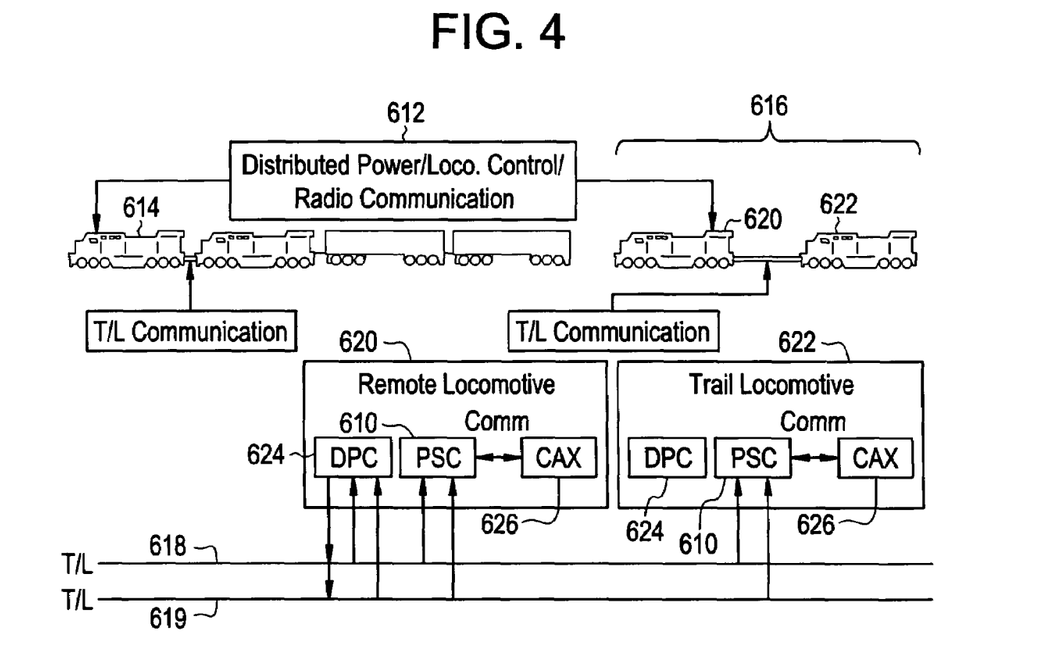
FIG. 4 is a schematic illustration of a train embodying aspects of the invention for selectably controlling the level of tractive effort produced by a locomotive.

In order for a remote locomotive to reduce tractive effort, that locomotive would initially determine whether it is equipped (e.g., via hardware, software or both) to operate in a reduced tractive effort mode, and provide a signal to other locomotives that indicates that it is equipped with selectable tractive effort capability. Similarly, a road number may be selected from a pre-defined list of road numbers indicating that the unit is equipped with selectable tractive effort. In one exemplary embodiment, an appropriate controller may monitor both the road number of the locomotive and/or the presence or absence of the signal of selective tractive effort capability to determine whether or not the locomotive is equipped to operate in a reduced tractive effort mode. At distributed power link time, the operator will select either the full tractive effort or reduced tractive effort mode. If the reduced tractive effort mode were selected, the distributed power unit on-board the lead locomotive would issue a configuration input signal instructing the remote DPC to operate in the reduced tractive effort mode. Assuming the remote distributed power units are configured for reduced tractive effort operations, the DPC controller 624 on-board the remote would then energize trainlines, such as trainlines 618 and 619 (two trainlines may be used for redundancy). In one exemplary embodiment, each locomotive in consist 616 would operate in reduced tractive effort when they detect that either or both of these trainlines have been energized, i.e. they receive the appropriate configuration input signal. Remote units that are equipped with the ability to operate in reduced tractive effort may default to this mode of operation for safety reasons. Remote units would return to normal levels of tractive effort when they detect that both trainline 618 and trainline 619 are de-energized. For example, this could happen when the operator selects the full tractive effort mode of operation and the remotes receive the command from the lead unit to operate in full tractive effort mode and both trainlines 618 and 619 are de-energized.

In one exemplary embodiment, the locomotive controller is configured to restrict the tractive effort, not necessarily the horsepower delivered by the locomotive. This allows normal performance at higher train speeds. As suggested above, two train lines may be used in order to provide a redundant, safe connection. It will be appreciated by those skilled in that art, that many communication techniques including wireless communication techniques may be used to communicate the desired operational mode.

In operation, controlled tractive effort (CTE) is a feature that selectively reduces tractive effort of locomotives that may be used as pushers or pullers, or both, in distributed-power mode. It is contemplated that one or more locomotives configured with CTE capability may be placed at the rear of the train depending, for example, on tonnage and controlled by a lead locomotive equipped with the distributed-power equipment, such as LOCOTROL® distributed-power equipment. It is further contemplated that if one or more pushers are used, each of them would be CTE-equipped and the controlling unit at the head end could be any DP-equipped unit. For example, assuming an AC4400CTE locomotive is used in a pusher application in distributed-power mode, its tractive effort may be selectively reduced from 145,000 pounds at 11 mph to 110,000 pounds at 11 mph. The tractive effort reduction would essentially reconfigure the ACT4400CTE locomotive equivalent to a Dash-9 locomotive in tractive effort, and thus advantageously make such AC locomotive practical for applications such as DP Push/Pull on freight trains that are used both in heavy hauling applications and in lighter hauling applications. Thus, in one aspect of the present invention, users of fleets of locomotives may be able to mix and match the tractive effort of the locomotives to the actual needs of any given train without having to wait for an available locomotive model capable of delivering the required tractive effort. Thus, the user would be able to use locomotives such as the ACT4400 CTE in multiple applications, including applications where a lesser rated locomotive (from the point of view of tractive effort capability) would be used without having to wait for availability of the lesser rated locomotive. Thus, aspects of the present invention allow the users of fleet of locomotives for efficiently increasing the versatility of operation of such fleets.

Figure 7:
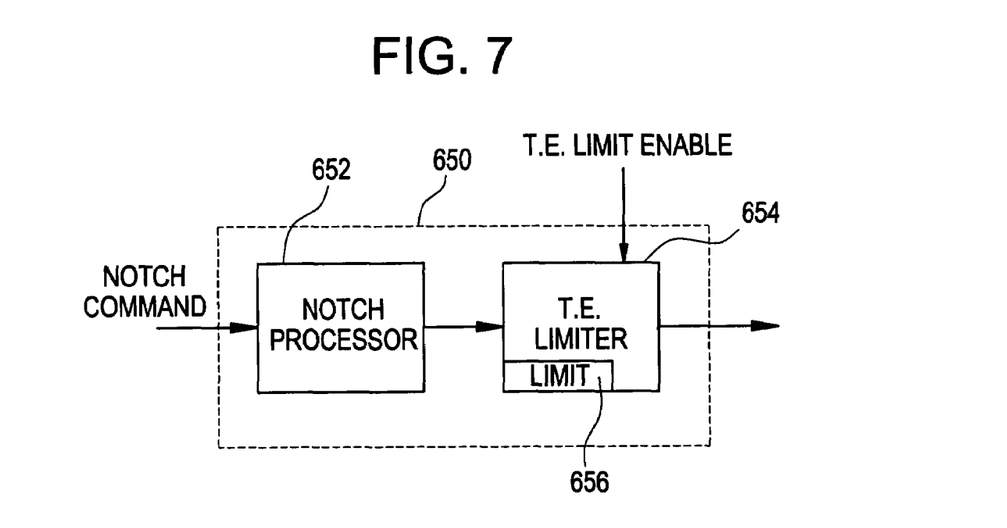
FIG. 7 is a block diagram of an exemplary tractive effort processor.

FIG. 7 is a basic block diagram used to facilitate understanding of operational aspects of the present invention. As shown in FIG. 7, a tractive effort processor 650 includes a notch processor 652 configured to generate a tractive effort consistent with a respective notch command supplied to the processor 652. A tractive effort limiter 654 is configured to limit the tractive effort using, for example, a tractive effort limit stored in a memory 656. In operation, upon activation of trainlines TL618 and TL619, the traction processor limits its total tractive effort reference in each motoring notch to the amount desired for limited tractive effort operation. The tractive effort reference may then be appropriately distributed (e.g., using standard optimization techniques) to each wheel axle based on the performance capability of each axle. Each axle and processor essentially comprises a closed loop mechanism that continuously processes feedback performance data, which is then used to re-allocate the distribution of tractive effort to each axle to best achieve the reference value of tractive effort. It will be appreciated that if axle capabilities are degraded due to conditions such as poor rail condition, thermal limitation or horsepower limitations, the reference may not be achieved even with optimal re-allocations of tractive effort to other axles. The operator may be informed of the limited tractive effort mode of operation by way of a summary message that may be displayed in a suitable display unit. The summary message may provide information indicative of whether or not tractive effort reduction is enabled, such as "TE Limited: TE Reduction Enabled".

The invention can also be embodied be implemented using computer programming or engineering techniques including computer software, firmware, hardware or any combination or subset thereof wherein the technical effect is to provide a system for monitoring and controlling locomotive engine emissions as described above. Any such resulting program, having computer-readable code means, may be embodied or provided within one or more computer-readable media, such as memory 24, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network. The invention may comprise one or more processing systems such as a central processing unit (CPU), memory, storage devices, communication links and devices, servers, I/O devices, or any sub-components of one or more processing systems, including software, firmware, hardware or any combination or subset thereof, which embody the invention as set forth in the claims. User input may be received from a keyboard, mouse, pen, voice, touch screen, switch or any other means by which a human can input data, including through other programs such as application programs. One skilled in the art of computer science will easily be able to combine the software created as described with appropriate general purpose or special purpose computer hardware to create a computer system or computer sub-system embodying the method of the invention.

Various changes could be made in the above exemplary embodiments without departing from the scope of the invention. It is intended that the above description and accompanying drawings shall be interpreted as illustrative and not in a limiting sense. For example, the invention is described as embodied in a locomotive, while similar systems and functions may be envisioned for any off-highway vehicle, marine vehicle, or stationary power generating unit that utilizes an electromotive drive system similar to that of a locomotive. In addition, the invention may be used for any mobile asset, such as cars, trucks, or busses, to manage the emissions of the mobile asset. It is further to be understood that the steps described herein are not to be construed as necessarily requiring their performance in the particular order discussed or illustrated. It is also to be understood that additional or alternative steps may be employed with the present invention.

What is claimed is:

1. A system for monitoring and controlling locomotive engine emissions comprising:
a location determination unit for determining a geographic location of a locomotive;
memory for storing a plurality of predetermined engine emission profiles, one profile for each of a plurality of geographic locations;
a processor in communication with the memory for accessing the engine emission profile for the determined location of the locomotive and generating an engine control command responsive to respective engine emission profile and engine operating parameters;
a control unit on board the locomotive controlling an operation of the locomotive responsive to the engine control command to limit the production of engine emissions to the corresponding emission profile;
a monitor unit monitoring values of an emission parameter of the locomotive indicative of the emissions produced by the engine; and
memory storing the values of the emission parameter of the locomotive and at least one of the time and the location of the locomotive when the engine emission was monitored.

2. The system of claim 1, further comprising:
a communications interface for transmitting the values of the emission parameter off-board the locomotive; and
a central monitoring system, remote from the locomotive, for receiving the values of the emission parameter transmitted via the communications interface.

3. The system of claim 1, wherein the monitor unit comprises a sensor selected from the group consisting of an engine inlet air temperature sensor, a fuel injection timing sensor, a fuel injection pressure sensor, and a sensor sensing engine exhaust characteristics.

4. The system of claim 1, wherein the monitor unit comprises:
an engine power sensor;
an engine speed sensor; and
a fuel usage sensor.

5. A method of monitoring locomotive engine emissions:
determining a location of a locomotive;
determining an emission profile of the locomotive as a function of the location of the locomotive;
controlling an operation of the locomotive in response to the emission profile;
monitoring values of an emission parameter of the locomotive corresponding to the emissions profile; and
storing the values of the emission parameter.

6. The method of claim 5, further comprising providing the values of the emission parameter to a central monitoring system off-board the locomotive.

7. The method of claim 6, further comprising determining, at the central monitoring system, compliance with the emission profile based on the values of the emission parameter.

8. The method of claim 7, further comprising allocating, at the central monitoring system, emission credits for values of the emission parameter less than a minimum value required by the emission profile.

9. A method of managing operation of a locomotive that moves between at least two operating areas, the locomotive having at least two emission profiles of operation, the locomotive traveling along a path comprised of at least two operating areas, each operating area having at least one emission profile associated therewith, with the emission profile of one operating area being different from that of a second area, the method comprising:
monitoring a location of the locomotive to determine its operating area;
controlling an operation of the locomotive as a function of the determined operation area and an associated emission profile, the emissions profile including a restriction on an operation of the locomotive based on its position relative to an emission control area; and
storing values of an emission parameter of the locomotive associated with operation of the locomotive in the operating area.

10. The method of claim 9, further comprising:
storing the values of the emission parameter on-board the locomotive; and
periodically downloading the stored emission values.

11. The method of claim 9, further comprising calculating a rate of engine emission discharge.

12. The method of claim 9, further comprising calculating an amount of an engine emission discharge during a time the locomotive is located in a predetermined geographic area.

13. The method of claim 9, wherein the locomotive is one of a fleet of similar locomotives, the method further comprising calculating an amount of engine emission discharge for each of the locomotives of the fleet located in a predetermined area during a selected interval of time.

14. The method of claim 13, further comprising controlling the operation of each of the locomotives entering, leaving, and operating in a predetermined operating area so that an amount of engine emission discharge from each of the locomotives does not exceed a predetermined limit.

15. The method of claim 9, wherein monitoring comprises a locomotive operator identifying movement of the locomotive from the one operating area to the second area.

16. The method of claim 15, wherein controlling comprises the operator controlling the operation of the locomotive responsive to the movement of the locomotive from the one operating area to the second area.

17. Computer readable media containing program instructions for monitoring locomotive engine emissions, the computer readable media comprising:
a computer program code for determining a location of a locomotive;
a computer program code for determining an emission profile of the locomotive as a function of the location of the locomotive;
a computer program code for controlling an operation of the locomotive in response to the emission profile;
a computer program code for monitoring values of an emission parameter of the locomotive corresponding to the emissions profile; and
a computer program code for storing the values of the emission parameter.

* * * * *